United States Patent
Auger

(10) Patent No.: US 7,219,928 B2
(45) Date of Patent: May 22, 2007

(54) ARTICULATED PROTECTIVE TARPAULIN FOR TOWED VEHICLE

(76) Inventor: Yves Auger, 12, La Martine, Levis, Quebec (CA) G6V 6L3

( * ) Notice: Subject to any disclaimer, the term of this patent is extended or adjusted under 35 U.S.C. 154(b) by 177 days.

(21) Appl. No.: 11/186,124

(22) Filed: Jul. 20, 2005

(65) Prior Publication Data

US 2007/0018480 A1 Jan. 25, 2007

(51) Int. Cl.
*B60R 9/02* (2006.01)
(52) U.S. Cl. ............................. 280/777; 150/166
(58) Field of Classification Search .......... 296/136.01, 296/180.1; 150/166; 280/155, 768, 770
See application file for complete search history.

(56) References Cited

U.S. PATENT DOCUMENTS

| | | | |
|---|---|---|---|
| 3,860,970 A | 1/1975 | Thompson | |
| 4,437,430 A | 3/1984 | DeBardeleben | |
| 4,867,499 A * | 9/1989 | Stephan et al. | 296/50 |
| 4,902,066 A * | 2/1990 | Norman | 296/180.1 |
| 4,932,705 A * | 6/1990 | Miller | 296/50 |
| 5,103,772 A | 4/1992 | Schmid | |
| 5,181,734 A * | 1/1993 | Brown | 280/414.1 |
| 5,411,312 A * | 5/1995 | Stallings | 296/180.1 |
| 6,022,038 A * | 2/2000 | Maxwell et al. | 280/507 |
| 6,119,629 A | 9/2000 | Sicchio | |
| 6,145,475 A | 11/2000 | Jackson | |
| 6,196,587 B1 * | 3/2001 | Sage | 280/770 |
| 6,341,578 B1 | 1/2002 | Bérubé | |
| 6,698,794 B2 * | 3/2004 | Trampe | 280/770 |
| 6,857,652 B2 * | 2/2005 | Dougherty | 280/507 |

* cited by examiner

*Primary Examiner*—Lori L. Lyjak

(57) ABSTRACT

An articulated protective tarpaulin for towed vehicle comprises two elements which are allowed to overlap when the towing vehicle is making a turn, one element being connected to the towing vehicle while the other element being connected to the towed vehicle.

3 Claims, 2 Drawing Sheets

Figure 1:
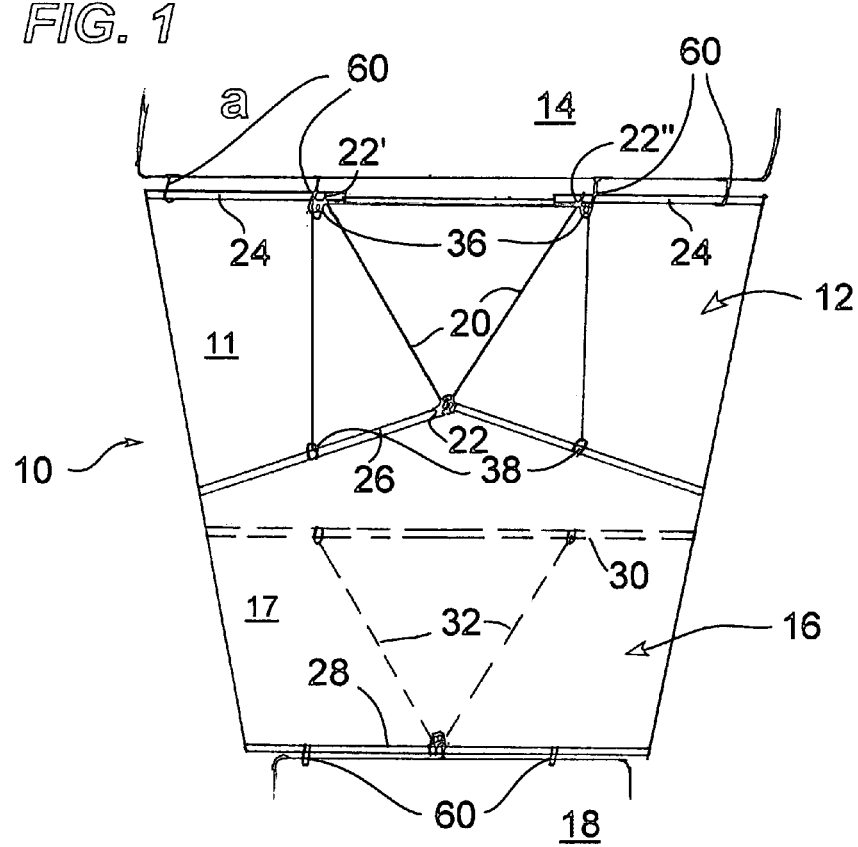
Figure 1:
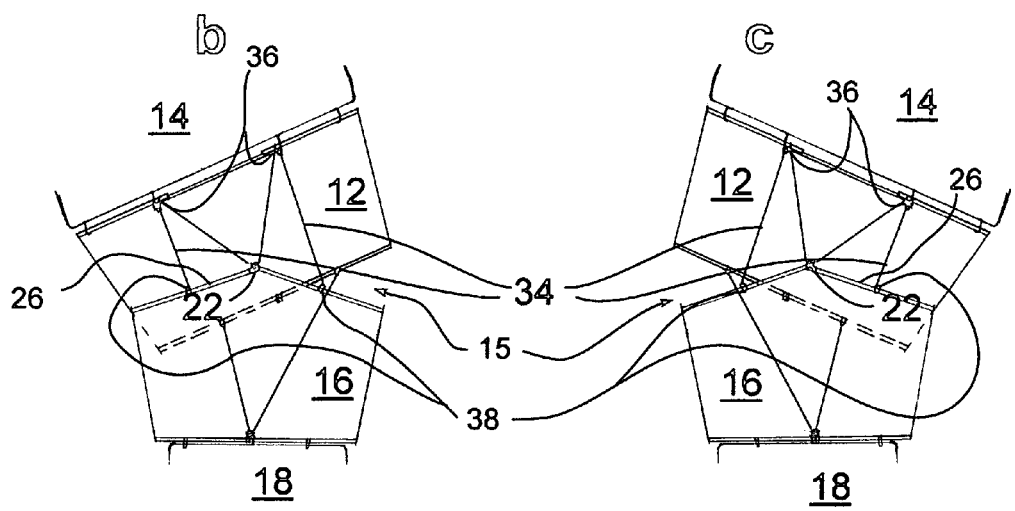

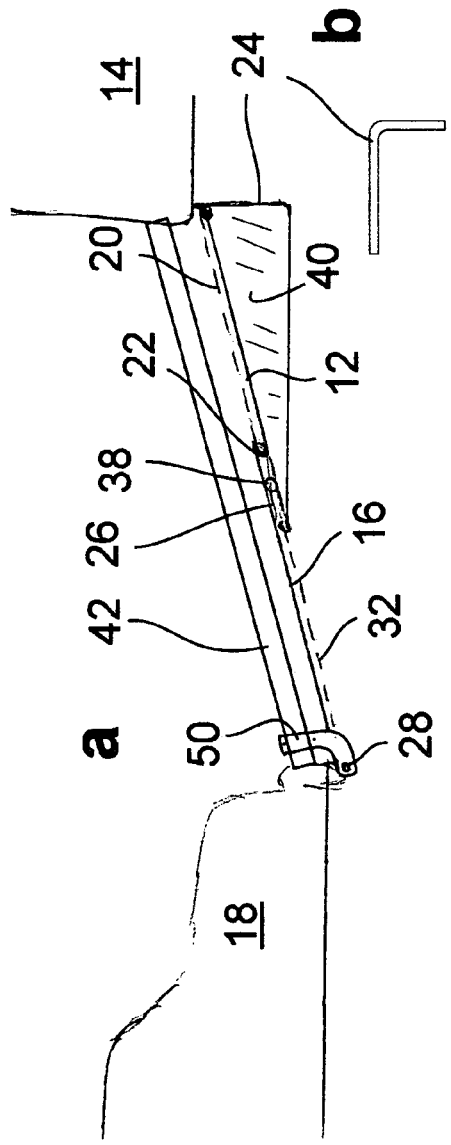
FIG. 2
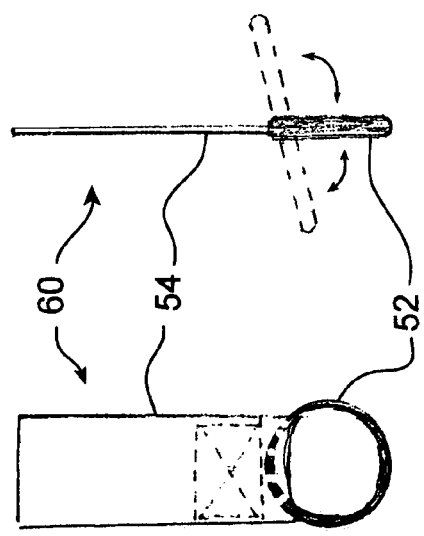
FIG. 3a
FIG. 3b

ARTICULATED PROTECTIVE TARPAULIN FOR TOWED VEHICLE

BACKGROUND OF THE INVENTION

1. Field of the Invention

The invention relates generally to protective covers and tarpaulins but more particularly to a protective cover for a towed vehicle.

2. Background of the Invention

Motorized camping is a popular activity and presents certain drawbacks depending upon the type of camper one uses. In the case of a fifth wheel type trailer, a user can separate the pickup truck from the trailer and use a much lighter and less cumbersome vehicle to run errands while the trailer itself is left at the campground. However, when one uses a motorhome, one has the choice to constantly travel around with the full motorhome even to run errands or else, tow a second vehicle which can be a motorbike or a car, or such vehicle. Of course, when towing a vehicle over long distances, the towed vehicle can be subjected to damage which would not readily be noticed by the motorhome occupants. Indeed, due to certain aerodynamic characteristics of motorhome in general, there is a large amount of dirt and debris which can be projected from underneath the motorhome onto the towed vehicle. In order to avoid that, the prior art teaches the use of protective shields. The drawbacks of such shields has to do with size, weight, lack of flexibility, and complexity in the dismantlement of such shields which can be necessary when one wants to untow the towed vehicle.

There are some instances where flexible tarplike shields have been described in the prior art, for example, U.S. Pat. No. 5,181,734 describes a shield device for protecting the front lower portion of a boat or automobile which is towed behind a towing vehicle by way of a tongue frame member constructed of an elongated rigid bar whose extremities pendantly hold paired resilient shield members. Elastic tethers extend from each extremity of the bar to the corresponding extremity of the rear bumper of the towing vehicle. By virtue of such construction, the shield members stay directly behind the rear wheels of the towing vehicle, even on curved roads.

U.S. Pat. No. 6,022,038 describes a protector for positioning in a space between two vehicles, one positioned behind the other. The protector including a protective member configured to fit into and substantially fill the space between the two vehicles, and movement apparatus connected to the protective member for accommodating relative movement between the two vehicles. In one aspect the protector is formed of flexible material such as screening, mesh, metal foil, cloth, canvas, fencing, fiberglass, nylon and plastic. In another aspect the protector has a submember formed of or secured to the protective member and positioned to protect the protective member from effects of a vehicle exhaust adjacent the protective member when the protector is emplaced between two vehicles.

U.S. Pat. No. 6,196,587 describes a tow shield and underskirt device comprising a flexible deflecting member that is adapted to be attached to the towing vehicle and the vehicle in tow to protect both vehicles and the tow bar from road debris that is thrown by moving vehicles during travel. Tensioned elastic members on the forward and rearward edges of the deflecting member hold the respective edges adjacent to the rear of the towing vehicle and adjacent to the front of the towed vehicle. The longitudinal sides of the deflecting member are supported by additional elastic members which lengthen and shorten as the vehicles maneuver around corners.

The major drawback in the prior art appears when the tracting vehicle makes a turn. In such a situation, which can occur quite frequently to varying degrees, as the tracting vehicle makes its turn, the towed vehicle has a delay before it starts its turn, this changes the configuration of the tarp: One side of the tarp is stretched with perhaps only the underlying string structure, which presents stretchable characteristics, being pulled out. This leaves an opened space between the tarp and the rear of the tracting vehicle while the other side becomes loose and may start from flap.

SUMMARY OF THE INVENTION

In view of the foregoing disadvantages inherent in the known devices now present in the prior art, there is a need for an improved protective tarp for towed vehicles. Although the prior art appears to provide solutions to complex installation deinstallation, weight issues, storage issues, there is still the issue of changes in direction which is not addressed properly. The present invention, which will be described subsequently in greater detail, is to provide objects and advantages which are:

To provide a protective tarpaulin that protects at all times, even during turns by eliminating opened gaps early in the turn when the towed vehicle can still receive damage.

To provide a protective tarpaulin that is easily installable and dismountable.

To provide a protective tarpaulin that is foldable for easy storage

To attain these ends, the present invention generally comprises two elements which are allowed to overlap when the towing vehicle is making a turn, one element being connected to the towing vehicle while the other element being connected to the towed vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitio ners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE PREFERRED EMBODIMENT

FIGS. 1abc top view of the articulated protective tarpaulin, straight, turning left, and turning right respectively.

FIG. 2a side view of the articulated protective tarpaulin.

FIG. 2b front view of an attachment frame.

FIGS. 3ab side and front view respectively of attachment means to the towed and the towing vehicles.

DETAILED DESCRIPTION OF THE PREFERRED EMBODIMENT

An articulated protective tarpaulin (10) is comprised of two elements: A first element (12) connected to a towing vehicle (14), and a second element (16) connected to a towed vehicle (18). The two elements (12, 16) are essentially separate and distinct except for a string retainer (20) which has three anchoring points (22, 22', 22"), two of those anchoring points (22', 22") are each attached to one of a pair of attachment frames (24) and the third anchoring point (22) is slidingly attached to a second element frame (26).

The first element (12) extends its tarp (11) from the pair of attachment frames (24) towards the towed vehicle (18) until it ends at an end frame (30). Each of the attachment frames (24) is attached to the towing vehicle (14) by attachment means (60) which can be any of a variety of means, by way of example, FIGS. 3ab show a ring (52) attached to a short strap (54) which is itself mechanically fastened to a solid part, usually on the frame of the vehicles (14, 18). The attachment frames (24) or a towed vehicle attachment frame (28) equipped with a standard hook (not shown) can hook into the ring (52). Any variations on such a means is acceptable since there is no specific way of attaching the attachment frames (24) and towed vehicle attachment frame (28) because of variations in structures on both vehicles (14, 18).

The second element frame (26) can be made of either two rod like parts or a single bent rod like part. The second element (16) extends its tarp (17) from the second element frame (26) towards the towed vehicle (18) where it terminates on the towed vehicle attachment frame (28). The towed vehicle attachment frame (28) is attached to the towed vehicle (18) by the means described hereinabove. A secondary string retainer (32) retains the end frame (30) to the towed vehicle attachment frame (28).

As can be seen on FIGS. 1bc, when the towing vehicle (14) executes a turn, the two elements (12, 16), being separate, are allowed to pivot relative to one another around anchoring point (22). A tensioning cable (34) pulls on one side of the second element frame (26) while giving slack to the other side of the second element frame (26). The tensioning cable (34) passes through a set of pulleys (36) (in fact the anchoring points 22' and 22") and starts and ends at tie downs (38). Beyond a certain point in the turn, as shown, there is a gap (15) between the two elements (12, 16) but at this point, the towed vehicle (18) is out of harm's way so any rocks or debris being projected by the towing vehicle (14) would not hit the towed vehicle (18).

FIG. 2 shows that the tarp (11) of the first element (12) has two sides (40) (one shown) forming a triangular configuration which reduces turbulence. The sides (40) are created by the attachment frames (24) being <<L>> shaped and going downwards. A standard tow bar (42) passes over both the first and second elements (12, 16). Any one of a variety of means known in the art can be used for connecting the towed vehicle attachment frame (28) to the towed vehicle (18). One such means involves at least one hook (50) which serves to attach the tow bar (42) to the towed vehicle (18).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An articulated protective tarpaulin for protecting a towed vehicle comprising:
   a first element connected to a towing vehicle, and a second element connected to a towed vehicle;
   both said elements being separate and distinct except for a string retainer having three anchoring points including two that are each attached to one of a pair of attachment frames and said third anchoring point being a pivot anchoring point attached to a second element frame;
   said first element extending its tarp from said pair of attachment frames towards the towed vehicle until it ends at an end frame;
   each said attachment frames being attached to said towing vehicle by attachment means;
   said second element extending its tarp from said second element frame towards a towed vehicle attachment frame;
   said towed vehicle attachment frame also being attached to said towed vehicle by said attachment means;
   a secondary string retainer retains said end frame to said towed vehicle attachment frame;

said third anchoring point being a pivot around which said first and second elements are allowed to pivot when said vehicles are engaging in turns;

a tensioning cable that pulls on one side of said second element frame while giving slack to the other side of said second element frame;

said tensioning cable passing through a set of pulleys and starting and ending at tie downs.

2. An articulated protective tarpaulin for protecting a towed vehicle as in claim 1 wherein:

said first element having two sides forming a triangular configuration which reduces turbulence and said sides being made by the <<L>> shape configuration of said attachment frames.

3. An articulated protective tarpaulin for protecting a towed vehicle as in claim 1 wherein said attachment means comprising:

a ring attached to a short strap which is itself mechanically fastened to a solid part, such as a frame of said vehicles;

said attachment frames or said towed vehicle attachment frame passing through said ring.

* * * * *